(12) United States Patent
O'Toole, III

(10) Patent No.: US 11,523,702 B1
(45) Date of Patent: Dec. 13, 2022

(54) INFUSER IMPLEMENT AND METHOD OF MANUFACTURE

(71) Applicant: Charles F O'Toole, III, Brookhaven, PA (US)

(72) Inventor: Charles F O'Toole, III, Brookhaven, PA (US)

(*) Notice: Subject to any disclaimer, the term of this patent is extended or adjusted under 35 U.S.C. 154(b) by 888 days.

(21) Appl. No.: 16/408,210

(22) Filed: May 9, 2019

Related U.S. Application Data

(60) Provisional application No. 62/669,495, filed on May 10, 2018.

(51) Int. Cl.
| | |
|---|---|
| *A47J 31/00* | (2006.01) |
| *A47J 31/06* | (2006.01) |
| *A47J 31/44* | (2006.01) |
| *B65B 29/02* | (2006.01) |
| *B65D 85/804* | (2006.01) |

(52) U.S. Cl.
CPC ............ *A47J 31/005* (2013.01); *A47J 31/06* (2013.01); *A47J 31/446* (2013.01); *B65B 29/025* (2017.08); *B65D 85/8046* (2013.01)

(58) Field of Classification Search
CPC ........ A47J 31/005; A47J 31/06; A47J 31/446; B65B 29/025; B65D 85/8046
See application file for complete search history.

(56) References Cited

U.S. PATENT DOCUMENTS

| | | | | |
|---|---|---|---|---|
| 5,277,103 | A | * | 1/1994 | Cox .................. A47G 19/16 206/541 |
| 5,738,786 | A | * | 4/1998 | Winnington-Ingram ................ A47J 31/0615 D7/415 |
| 2005/0217213 | A1 | * | 10/2005 | Lozinski ................. A47J 31/44 53/559 |
| 2010/0112104 | A1 | * | 5/2010 | Aleotti ..................... A61P 3/04 548/366.1 |
| 2012/0251677 | A1 | * | 10/2012 | Yoakim ............. B65D 85/8058 426/112 |
| 2014/0161936 | A1 | * | 6/2014 | Trombetta ........... B65D 85/816 426/77 |
| 2016/0039601 | A1 | * | 2/2016 | Doglioni Majer .... A47J 31/407 426/112 |
| 2018/0064283 | A1 | * | 3/2018 | Hertaus ................... A47J 31/20 |

* cited by examiner

*Primary Examiner* — Anthony J Weier

(57) ABSTRACT

A disposable infusing implement for preparing infused beverages, and method of manufacturing the implement. The implement has on its distal end a separately releasable, permeable textile container which holds an apportioned measure of infusible, dried solids such as tea or coffee. The proximal end of the member serves as a handle for directing the distal end into a vessel of liquid, where it can be agitated to aid in steeping tea or ground coffee. After steeping/infusion, the permeable textile container portion may be disposed of and the handle used again. The textile container's permeable cup part is heated and pressed in a die. Infusible, granulated, dried solids such as coffee or tea are apportioned to fill the permeable chamber, and then a lid and flange are pressed atop to fixedly adhere to the permeable textile container, allowing the implement to be packed, formed and sealed from one side.

5 Claims, 6 Drawing Sheets

100

100

INFUSER IMPLEMENT AND METHOD OF MANUFACTURE

TECHNICAL FIELD

The present disclosure relates to a handheld implement for infusing tea or coffee or other dried granular food substance to provide an infused beverage.

BACKGROUND

Implements for beverage infusion, steeping, or brewing are well represented in prior art. Infusible granular food substances such as tea and coffee solids may be provided in combination with stirring devices to provide an infused beverage such as tea or coffee. Various methods of preparation of infused, steeped or brewed beverages such as coffee or tea are well known. Among the "instant" methods of preparation, a granular substance such as ground coffee that comes packed in a permeable filter is immersed in water to provide an infused beverage.

Infused, steeped or brewed beverages are commonly prepared by pouring water through dried, granular food substances such as ground coffee or dried leaf tea, which is separated by a filter; or by infusing dried, granular food substances in water. Filters are used to separate the granular or leaf food substance from the beverage. Non-woven materials for coffee or tea filters, infuser pouches or infuser bags are commonly made of nylon micron mesh fabric; spun-bond, needle-punched, or spun-lace synthetic fabric; chemical-bond lightweight synthetic fabric; felt; paper; polypropylene, or viscose.

SUMMARY

The present disclosure relates to a hand-held, disposable infusing implement for preparing infused beverages. It comprises a planar, elongate member with first and second ends. The first end is referred to as a proximal end and the second end, a distal end. Along one plane of the distal end of the planar member, a separately releasable, permeable textile container (which in some embodiments is cup-shaped) and a matching lid are removably mounted via a catching mechanism in a structural housing. The proximal end of the member serves as a handle for directing the distal end into a vessel of liquid, where it may be left to steep or agitated to aid in steeping of dry solids such as tea, ground coffee, or to infuse in cold liquid, dry solids such as fruit or spices. The distal end's permeable textile container holds such dry solids, and a planar, locking lid is held in place with a catching flange.

The implement steeps infusible, dried solids into liquid to make an infused beverage such as tea or coffee, or an infused cold beverage such as flavored water. One skilled in the art understands that dry solids include coffee, tea, dried fruit or powdered flavoring, or charcoal for purposes of infusing in water to purify it by adsorbing impurities; or a chemical preparation for reducing sulfites in wine. In some embodiments the dry solids are provided enclosed as single servings within the implement's permeable textile chamber. After steeping/infusion/adsorption, the permeable-textile container portion may be disposed of and the handle used again with another textile container portion.

In some embodiments the permeable textile container is rotated between 3 and 7 degrees clockwise. In a preferred embodiment, the permeable textile container is rotated approximately 5 degrees clockwise.

The implement's method of manufacture involves the permeable textile container's textile chamber part to be heated and pressed in a die. Infusible, granulated, dried solids are apportioned to fill the permeable textile container, and then a lid and flange are pressed atop to adhere to the permeable textile container, allowing the implement to be packed, formed and sealed from one side.

BRIEF DESCRIPTION OF THE DRAWINGS

The references below are made to assist those of skill in the art in making and using the disclosed apparatus and method. The description is intended to define but not limit the scope of the invention.

DESCRIPTION

Figure 1:
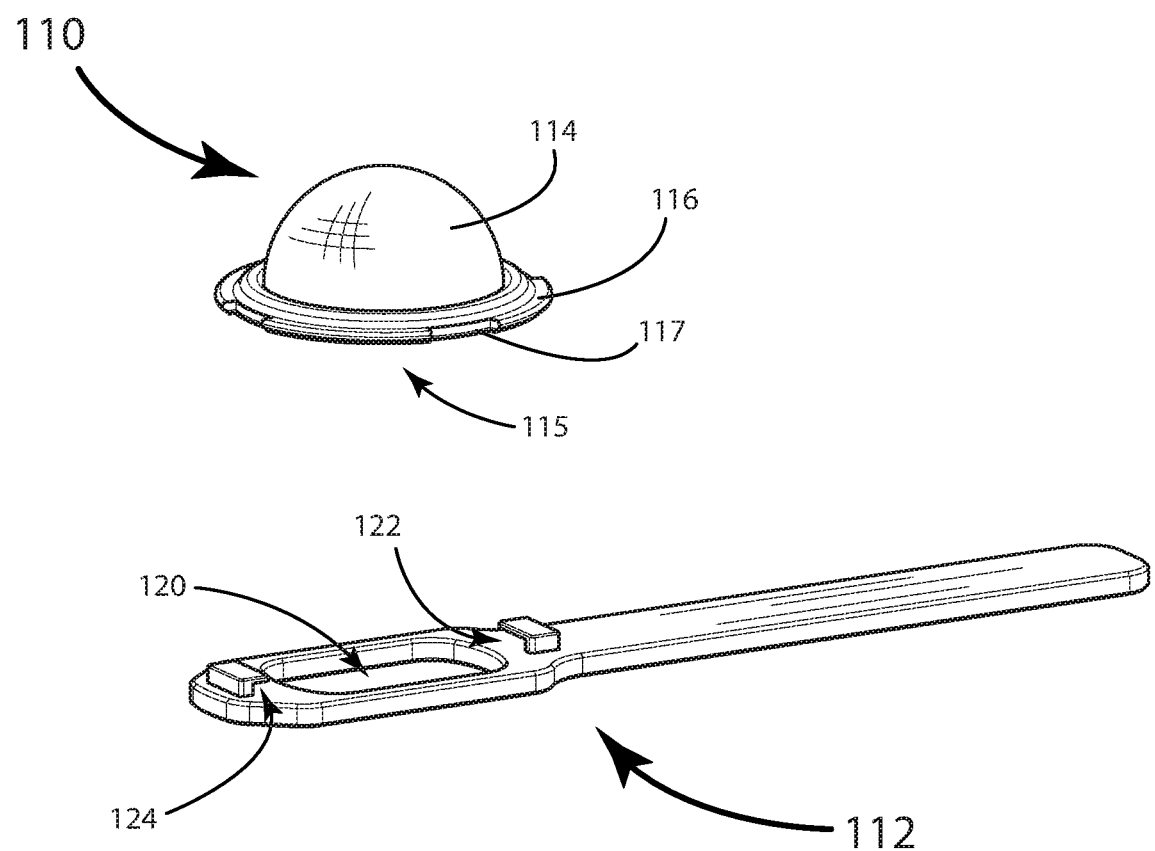
FIG. 1 is an illustration of an example embodiment in an exploded view.

Referring to FIG. 1, in example embodiment 100: a preferably cup-shaped permeable textile container 110 has a permeable textile chamber 114 which is engaged with a notched flange 116. The permeable chamber 114 is filled with granulated, infusible solids, and covered by a lid 115 which is engaged with the notched flange 116 (FIG. 1). A planar, elongate handle 112 is positioned laterally with its opening 120 against the cup-shaped container 110 so that the container's notches 117 may be rotated clockwise to insert into catches 122, 124 on the distal end of the elongate handle 112.

Figure 2:
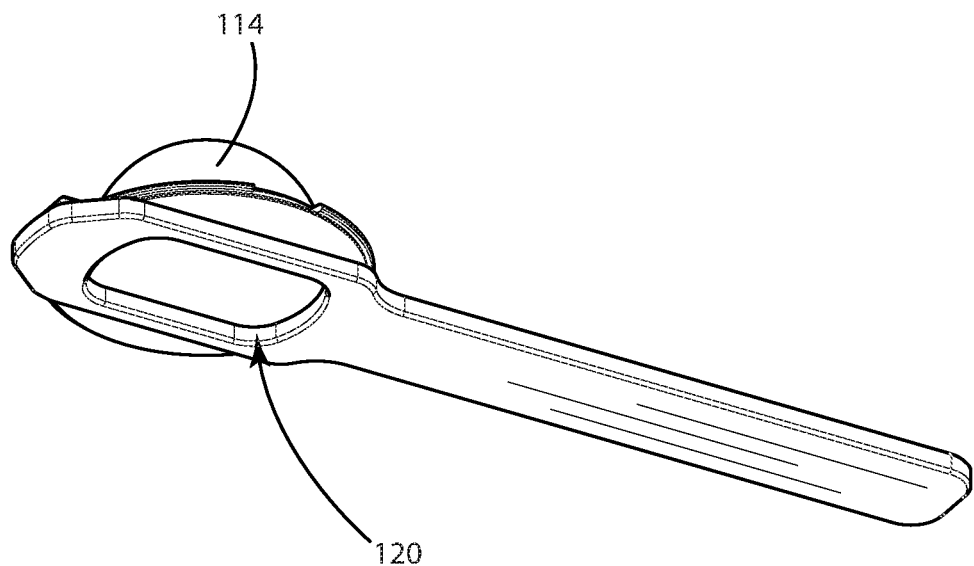
FIG. 2 is a bottom, perspective view of an example embodiment.

FIG. 2 is a perspective view of the example embodiment 100 showing the permeable textile container 110 attached to the handle, with the opening 120 through which liquid passes through the permeable textile chamber 114.

Figure 3A:
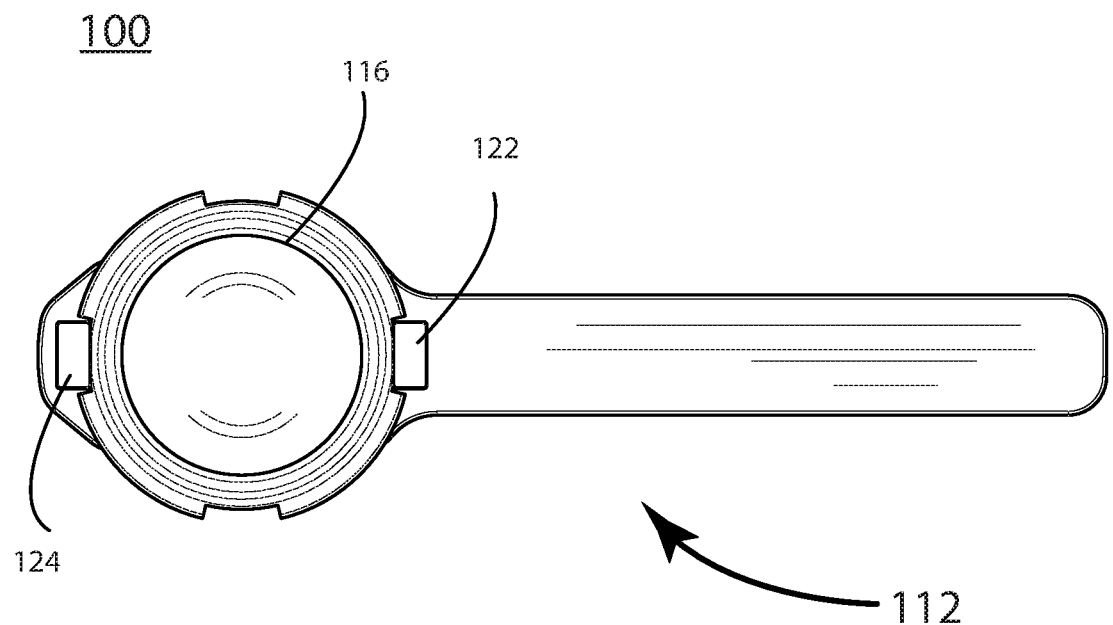
FIGS. 3A and 3B are top, orthographic views of the embodiment of FIGS. 1 and 2.
Figure 3B:
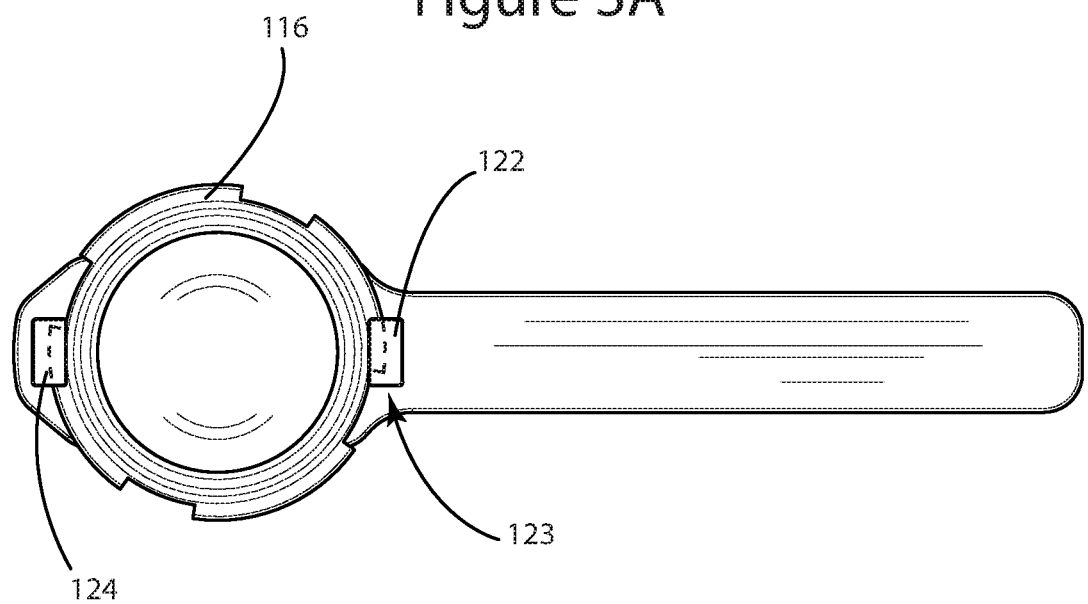

FIGS. 3A and 3B are orthographic views illustrating the locking mechanism of the notched flange 116 in the catches 122, 124 of the handle 112. FIG. 3A shows the flange 116 of the container in place on the handle 112 before being rotated and secured. FIG. 3B shows the flange 116 rotated clockwise so that its notches are held by the catches 122, 124. Catch 124 is open on the two shortest sides of the rectangular form. Catch 122 is open on two sides having a closed side 123 for stopping the rotation of the flange 116 when it has been sufficiently engaged with the handle 112.

Figure 4:
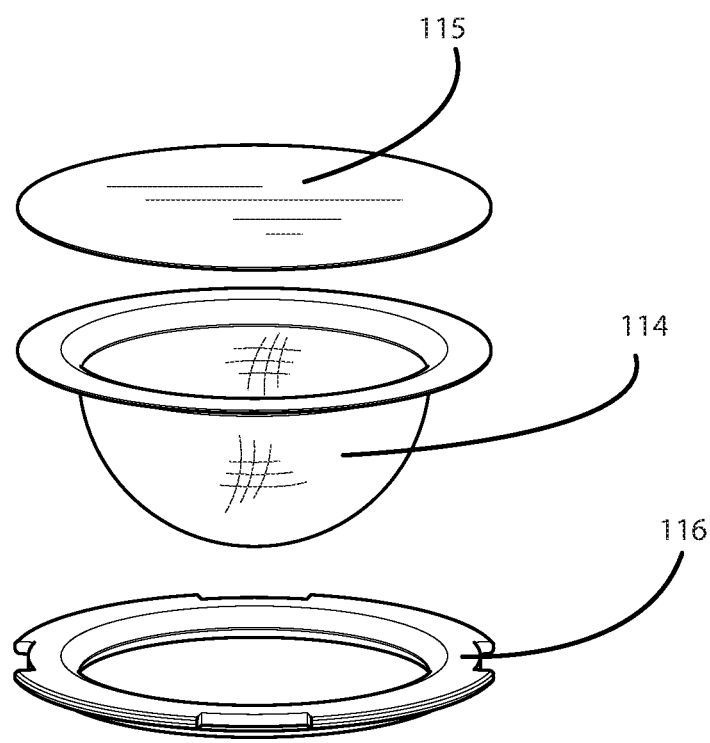
FIG. 4 is an exploded view of the permeable textile container.

FIG. 4 is an exploded view of the permeable textile container's parts. The container's lid 115 is fixedly engaged with the permeable chamber 114 to hold an apportioned measure of granulated, infusible solids. The lid and chamber are fixedly engaged with the flange 116.

Figure 5:
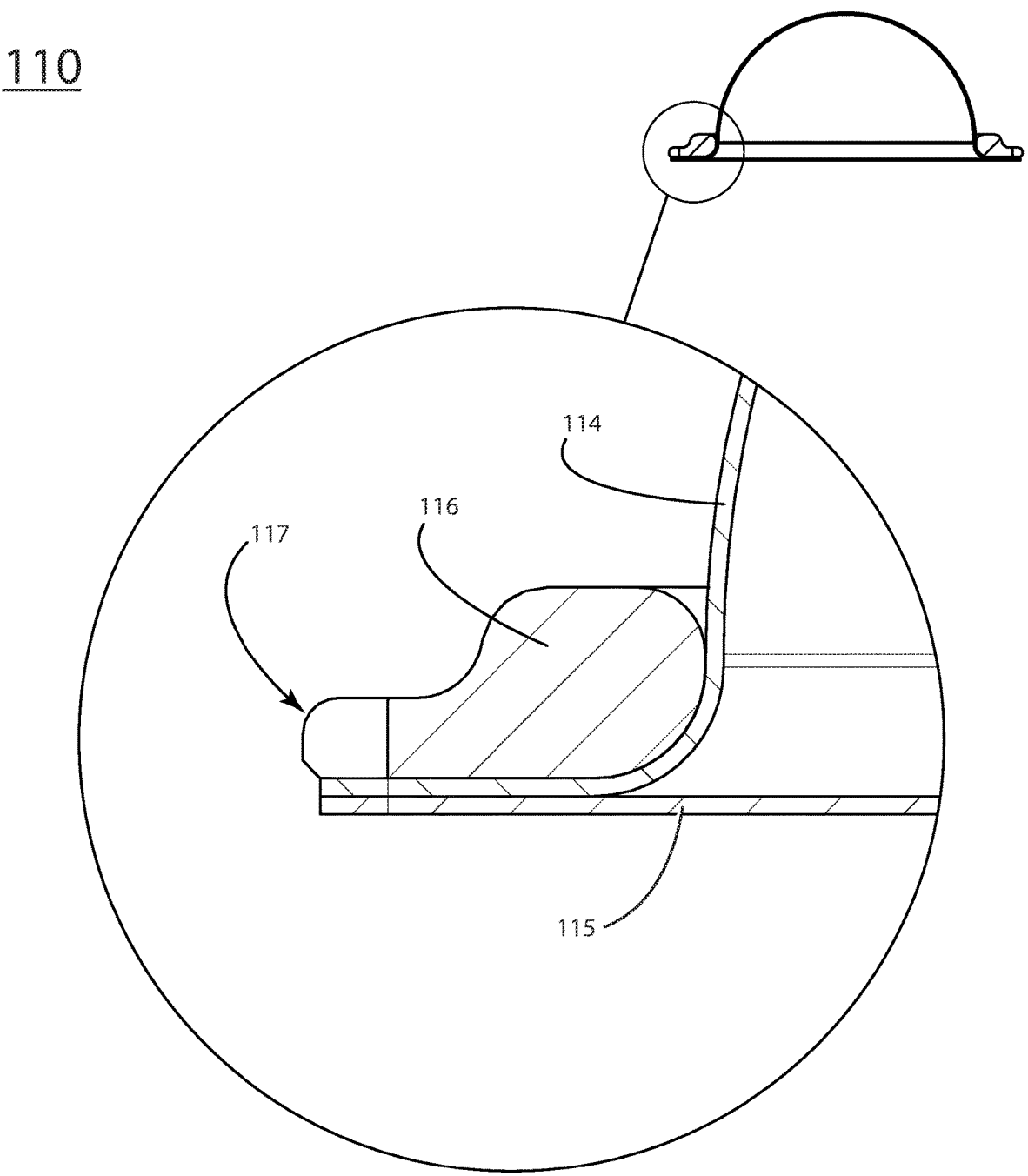
FIG. 5 is a detailed, section view of the permeable textile container of the example embodiment.

FIG. 5 is a detailed, section view of the permeable textile container 110 showing in detail a section of the permeable chamber 114 engaged with the flange 116 and with the permeable textile container's lid 115. The permeable chamber material and permeable textile container's lid material are cut through the container's notches 117. The manner of construction allows for a permeable material that adheres to the flange 116 when heat is applied.

Figure 6:
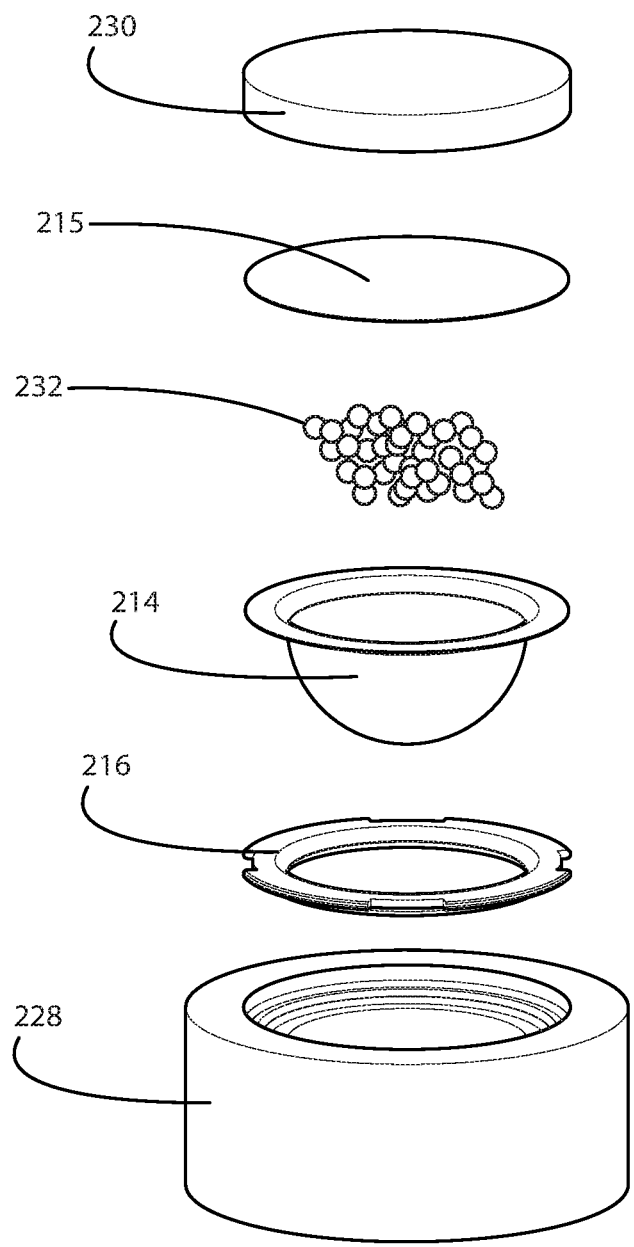
FIG. 6 is an exploded view illustrating a method of manufacture.

FIG. 6 is an exploded view illustrating a method of manufacture. A method for manufacture includes inserting a flange 216 in a die 228, inserting a permeable chamber 214 into the flange 216 and so into the die 228; pressing an amount of granulated substance 232 into the permeable chamber 214, covering the combination flange 216, permeable chamber 214, and granular substance 232 with a permeable lid 215, and sealing with a heated press 230 the edges of the lid 215 and chamber 214 against the flange 216 in the areas where they come in contact with the flange.

The invention claimed is:

1. An apparatus for holding an immersible textile container comprising:
   an elongate member having a proximal end and a distal end; and
   the proximal end being a handle; and
   the distal end having at least one catch mechanism; and
   an immersible textile container, further comprising:
      an outer edge of the immersible textile container fixedly engaged with a flange; and
      said flange having at least one notch; wherein
   the at least one notch in the textile-container flange is removably engaged with the at least one catch mechanism.

2. The apparatus of claim 1 wherein
   the immersible textile container is permanently sealed and
   the permanently sealed immersible textile container is filled with infusible substance, and is immersed in liquid to infuse the liquid with the infusible substance.

3. An apparatus for holding an immersible textile container comprising:
   an elongate member having a proximal end and a distal end; and
   the proximal end for grasping; and
   the distal end having an annular flange surrounding a hole; and
   a first catch and a second catch engaged with said annular flange; and
   said first catch, being a rectangular form having a first pair of wide, long faces, a first pair of narrow, long faces and a first pair of short narrow faces, one of said first pair of wide, long faces engaged with said annular flange, the rectangular form having an opening across one of said first pair of said long, narrow sides and on said first pair of short, narrow sides; and
   said second catch being a rectangular form, having a second pair of wide, long faces, a second pair of narrow, long faces and a second pair of short narrow faces one of said second pair of wide, long faces engaged with said annular flange, the rectangular form having an opening across one of said second pair of said long, narrow sides and one of said second pair of short, narrow sides; wherein
   the elongate member is a handle and the first catch and second catch receive and hold the annular flange of said immersible textile container.

4. The apparatus of claim 3 further comprising:
   an immersible textile container having a porous textile bag fixedly engaged with a flange; and
   said flange having an interior edge and an outer edge and at least a first notch and at least a second notch; and
   said first and second notch being a rectangular cut through the outer edge of said flange; and
   said first notch and said second notch fitting over said first and second catch respectively; and
   said flange outer edge passing through one open side on said first catch and said second catch; and
   the flange outer edge proximal to said second notch removably engaging with one side of said second catch; wherein
   the immersible textile container and notched flange combination is removably engaged with the apparatus for holding an immersible textile container.

5. The apparatus of claim 3 wherein
   the filter chamber is dome-shaped.

\* \* \* \* \*